(12) United States Patent
Regester et al.

(10) Patent No.: US 8,119,915 B2
(45) Date of Patent: Feb. 21, 2012

(54) CABLE MANAGEMENT PATCH PANEL SYSTEM WITH VERTICAL DUCTING

(75) Inventors: William D. Regester, Bothell, WA (US); Frank Chin-Hwan Kim, Woodinville, WA (US); Ross Goldman, Woodinville, WA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 739 days.

(21) Appl. No.: 12/243,200

(22) Filed: Oct. 1, 2008

(65) Prior Publication Data

US 2009/0090534 A1 Apr. 9, 2009

Related U.S. Application Data

(60) Provisional application No. 60/978,041, filed on Oct. 5, 2007.

(51) Int. Cl.
*H02G 3/00* (2006.01)
(52) U.S. Cl. ..... 174/100; 174/68.1; 174/68.3; 174/72 A; 385/134; 385/135
(58) Field of Classification Search ............ 174/68.1, 174/68.3, 135, 72 A, 72 R, 72 C, 88 R, 70 C, 174/95, 100; 385/134, 135, 136; 211/26, 211/26.1, 26.2; 439/540.1, 719, 489; 248/49, 248/65
See application file for complete search history.

(56) References Cited

U.S. PATENT DOCUMENTS

| | | | |
|---|---|---|---|
| 5,758,002 A * | 5/1998 | Walters | 385/135 |
| 5,765,698 A | 6/1998 | Bullivant | |
| 5,921,402 A | 7/1999 | Magenheimer | |
| 6,427,952 B2 | 8/2002 | Caveney et al. | |
| D473,449 S | 4/2003 | Wu et al. | |
| 6,572,058 B1 | 6/2003 | Gerardo | |
| 6,636,680 B2 | 10/2003 | Wu et al. | |
| 6,946,605 B2 | 9/2005 | Levesque et al. | |
| 6,964,588 B2 * | 11/2005 | Follingstad et al. | 439/719 |
| 6,981,893 B2 * | 1/2006 | Barker et al. | 439/540.1 |
| 7,026,553 B2 | 4/2006 | Levesque et al. | |
| 7,119,282 B2 | 10/2006 | Krietzman et al. | |
| 7,259,325 B2 | 8/2007 | Pincu et al. | |
| 7,285,027 B2 * | 10/2007 | McGrath et al. | 439/719 |
| 7,362,941 B2 * | 4/2008 | Rinderer et al. | 385/134 |
| 7,607,938 B2 * | 10/2009 | Clark et al. | 385/135 |
| 7,734,139 B2 * | 6/2010 | Rector, III | 385/136 |
| 7,748,541 B2 * | 7/2010 | Smith et al. | 211/26.2 |
| 7,762,405 B2 * | 7/2010 | Vogel et al. | 211/26 |
| 7,766,701 B2 * | 8/2010 | Follingstad et al. | 439/719 |
| 7,854,624 B1 * | 12/2010 | Pepe | 439/489 |
| 7,893,356 B2 * | 2/2011 | Garza et al. | 174/100 |

* cited by examiner

*Primary Examiner* — Angel R Estrada
(74) *Attorney, Agent, or Firm* — Davis Wright Tremaine LLP; George C. Rondeau, Jr.; Heather M. Colburn

(57) ABSTRACT

A cable management patch panel system having one or more vertical ducting enclosures and typically located in an equipment rack. The vertical ducting enclosure is integral with the patch panel system and allows for vertical routing of cables connected to the patch panel system. The cables are vertically routed by the ducting enclosure to other patch panels or equipment located along with the patch panel system in a commonly shared equipment rack or located beyond the equipment rack.

23 Claims, 4 Drawing Sheets

CABLE MANAGEMENT PATCH PANEL SYSTEM WITH VERTICAL DUCTING

CROSS REFERENCE TO RELATED APPLICATION(S)

This application claims the benefit of U.S. Provisional Application No. 60/978,041, filed Oct. 5, 2007.

BACKGROUND OF THE INVENTION

1. Field of the Invention

The present invention is directed generally to cable management systems to be located in equipment racks.

2. Description of the Related Art

Patch panels typically are located in equipment racks. The patch panels have many cables connected to them that can be problematic to route to and from the patch panels.

BRIEF DESCRIPTION OF THE SEVERAL VIEWS OF THE DRAWING(S)

DETAILED DESCRIPTION OF THE INVENTION

Disclosed herein is a cable management patch panel system having one or more vertical ducting and typically located in an equipment rack. The vertical ducting is integral with the patch panel system and allows for vertical routing of cables connected to the patch panel system. The cables are vertically routed by the ducting to other patch panels or equipment located along with the patch panel system in a commonly shared equipment rack or located beyond the commonly shared equipment rack.

Figure 1:
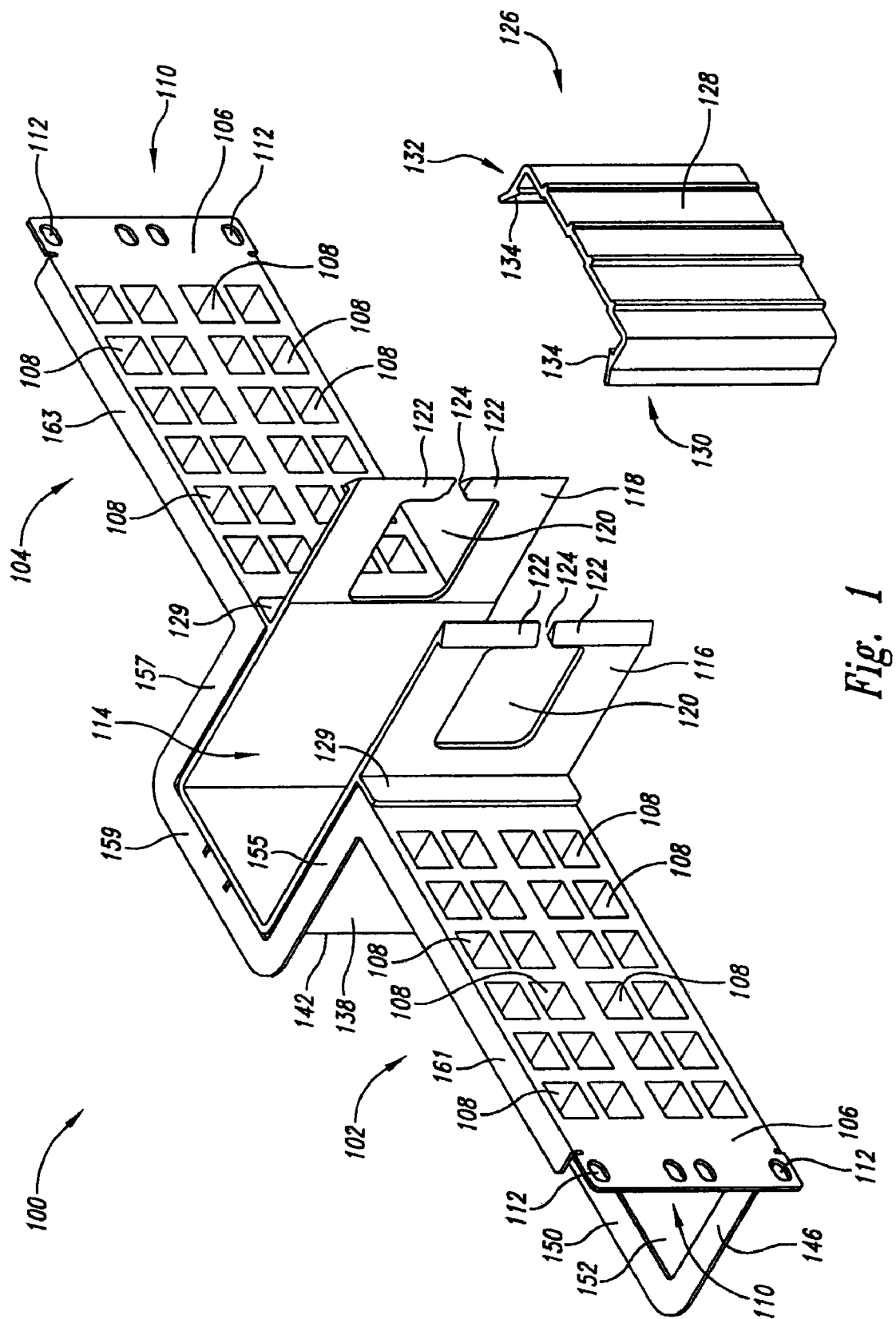
FIG. 1 is an exploded front perspective view of a four row cable management patch panel system with vertical ducting.

As shown in FIG. 1, a cable management patch panel system 100 includes a first connector panel portion 102 and a second connector panel portion 104, each having a front surface 106 and each having four rows of connectors 108 mounted in four rows of apertures. In the illustrated embodiment the first and second connector portions 102 and 104 are planar and in coplanar arrangement, but in alternative embodiments the first and second connector portions can have other shapes and be angled relative to each other to provide a "V" shape or other shape profile. Each of the first connector portion 102 and the second connector portion 104 has a bracket section 110 with bolt holes 112 for attachment of the patch panel system to an equipment rack 160 (shown in FIG. 3).

The patch panel system 100 further includes a vertical ducting enclosure 114, shown in FIG. 1 as being centrally positioned between the first connector portion 102 and the second connector portion 104. The vertical ducting enclosure 114 includes an enclosure with an upper open end and a lower open end sized to receive cables therein for routing through the upward and lower open ends. In other implementations, the vertical ducting enclosure 114 is positioned off-center so that one of the first connector portion 102 and the second connector portion 104 has more of the connectors 108 than the other.

Figure 3:
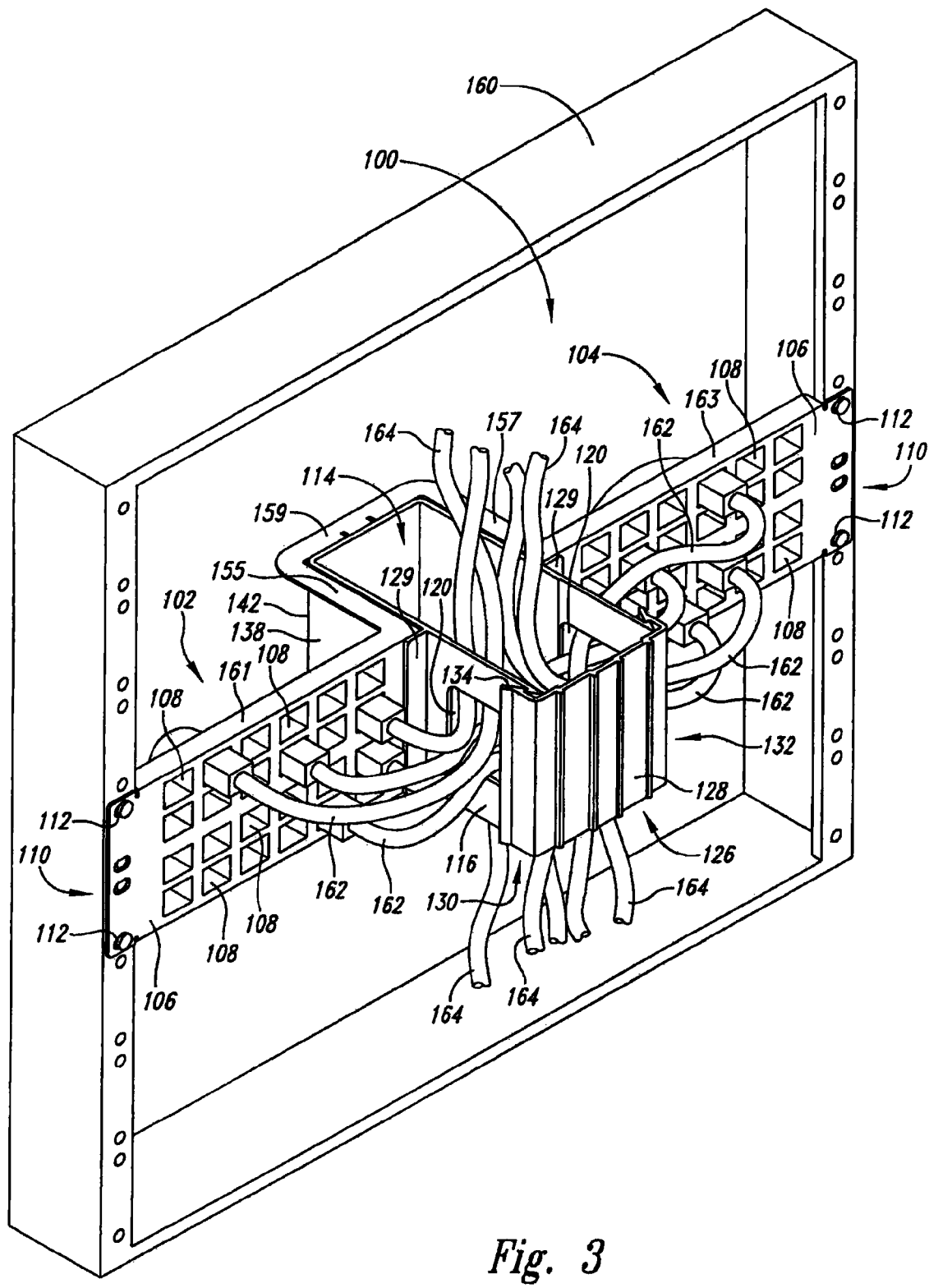
FIG. 3 is front perspective view of the patch panel system of FIG. 1 as installed in an equipment rack.

The vertical ducting enclosure 114 is a connectorless portion and includes a first front side wall 116 extending forward beyond the front surface 106 of the first connector portion 102 and a second front side wall 118 extending forward beyond the front surface of the second connector portion 104. Both the first front side wall 116 and the second front side wall 118 each have an opening 120 to receive cables, an overlapped front edge portion 122 with a slot 124 to allow movement of cables in and out of the opening. The vertical ducting enclosure 114 further includes a front cover 126 with a front face wall 128. A first side 130 and a second side 132 extends from the front cover 126, with each having an edge 134 that when in a mounted position as shown in FIG. 3 interlocks with the corresponding overlapped front edge 122 of the first front side wall 116 and the second front side wall 118 with the front face wall 128 closing the opening therebetween. A flange 129 projects laterally outward from each of the first and second front side walls 116 and 118, and is positioned at the laterally inward end of the front surface 106 the correspondingly positioned one of the first and second front side walls.

Figure 2:
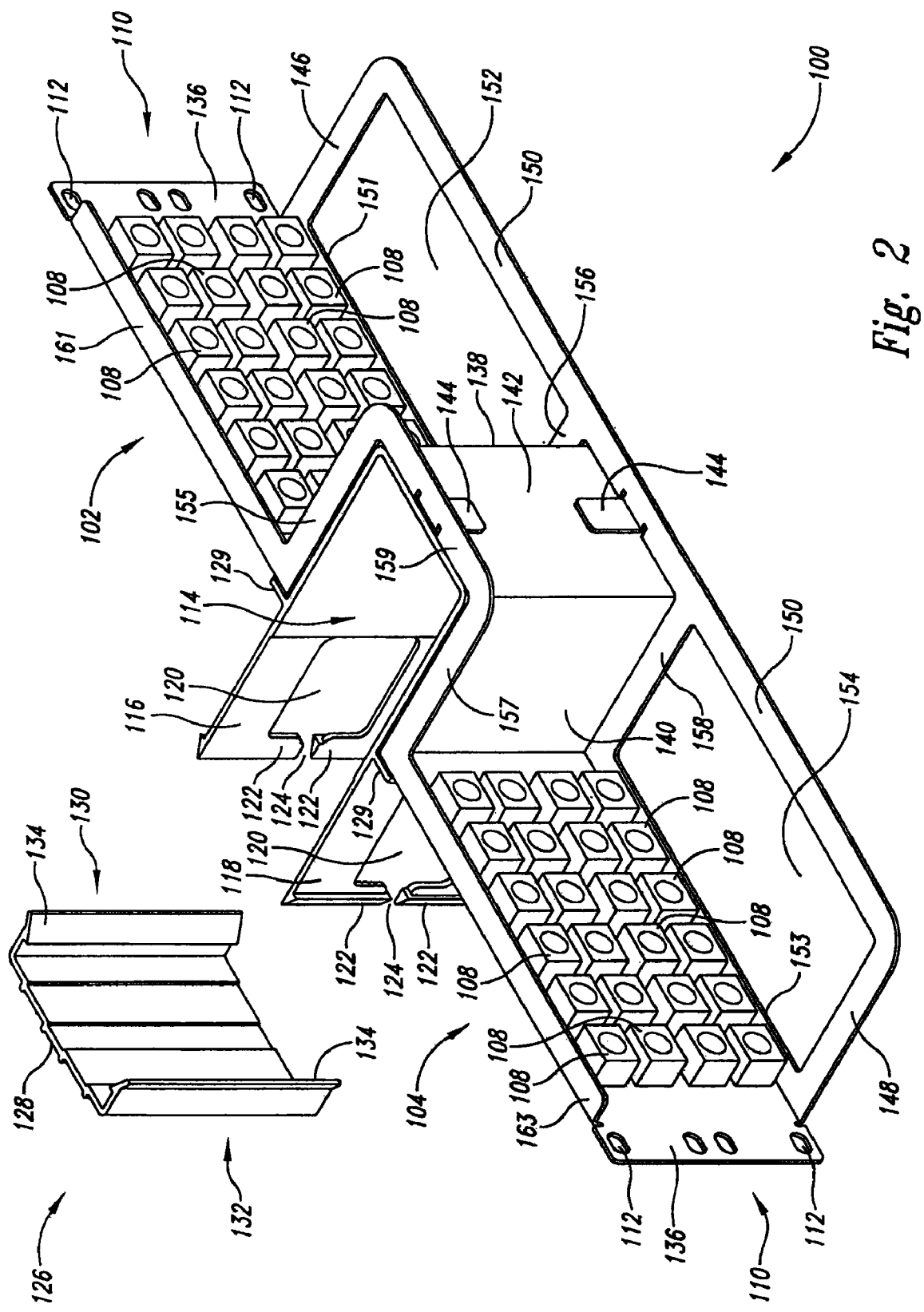
FIG. 2 is an exploded rear perspective view of the four row patch panel system of FIG. 1.

As shown in FIG. 2, the first connector portion 102 and the second connector portion 104 each have a rear surface 136. The vertical ducting enclosure 114 has a first rear side wall 138 coupled to the first front side wall 116 and extending rearward beyond the rear surface 136 of the first connector portion 102, a second rear side wall 140 coupled to the second front side wall 118 and extending rearward beyond the rear surface 136 of the second connector portion 104, and a rear face wall 142 coupled to and extending between the first and second rear side walls.

The patch panel system 100 also has a first rearward bar portion 146 that is coupled to the first connector portion 102 at a laterally outward lower end of the rear surface 136 thereof and extends rearward therebeyond, a second rearward bar portion 148 that is coupled to the second connector portion 104 at a laterally outward lower end of the rear surface 136 thereof and extends rearward therebeyond, and a lateral bar portion 150 coupled to and extending between the first and second rearward bar portions. A third rearward bar portion 156 is coupled to the first connector portion 102 at a laterally inward lower end of the rear surface 136 thereof and extends rearward therebeyond, running along the first rear side wall 138, and a fourth rearward bar portion 158 is coupled to the second connector portion 104 at a laterally inward lower end of the rear surface 136 thereof and extends rearward therebeyond, running along the second rear side wall 140. The third and fourth rearward bar portions 156 and 158, and the lateral bar portion 150 define a space therebetween at the lower end of the first and second connector portions 102 and 104 within which the vertical ducting enclosure 114 is positioned.

A lateral bar portion 151 is coupled to the first connector portion 102 at a lower end of the rear surface 136 thereof and extends between the first rearward bar portion 146 and the third rearward bar portion 156, and a lateral bar portion 153 is coupled to the second connector portion 104 at a lower end of the rear surface 136 thereof and extends between the second rearward bar portion 148 and the fourth rearward bar portion 158. The lateral bar portion 150, the lateral bar portion 151, the first rearward bar portion 146 and the third rearward bar portion 156 form a first rear opening 152 therebetween rearward of the first connector portion 102, and the lateral bar portion 150, the lateral bar portion 153, the second rearward bar portion 148 and the fourth rearward bar portion 158 form a second rear opening 154 therebetween rearward of the second connector portion 104, to help vertically guide at least some of the cables connected to the portions of the connectors 108 extending from the rear surface 136 of the first and second connector portions, respectively.

The patch panel system 100 also has a fifth rearward bar portion 155 that is coupled to the first connector portion 102 at a laterally inward upper end of the rear surface 136 thereof and extends rearward therebeyond, a sixth rearward bar portion 157 that is coupled to the second connector portion 104 at a laterally inward upper end of the rear surface 136 thereof and extends rearward therebeyond, and a lateral bar portion 159 coupled to and extending between the fifth and sixth rearward bar portions. The fifth and sixth rearward bar portions 155 and 157, and the lateral bar portion 159 define a space therebetween at the upper end of the first and second connector portions 102 and 104 within which the vertical ducting enclosure 114 is positioned. The lateral bar portion 150 and the lateral bar portion 159 each have a tab 144 extending toward the other and positioned at the rearward side of the rear face wall 142 of the vertical ducting enclosure 114.

A lateral bar portion 161 is coupled to the first connector portion 102 at an upper end of the rear surface 136 thereof and extends from the fifth rearward bar portion 155 laterally outward, and a lateral bar portion 163 is coupled to the second connector portion 104 at an upper lower end of the rear surface 136 thereof and extends from the sixth rearward bar portion 157 laterally outward.

As shown in FIG. 3, when installed in the equipment rack 160 having spaced apart first and second upright side members, cables 162 coupled to the connectors 108 and extending from the front surface 106 can be routed laterally through the openings 120 into the vertical ducting enclosure 114 for vertical routing. Other cables 164 coupled to other patch panels or equipment (not shown) can also be routed through the vertical ducting enclosure 114.

Figure 4:
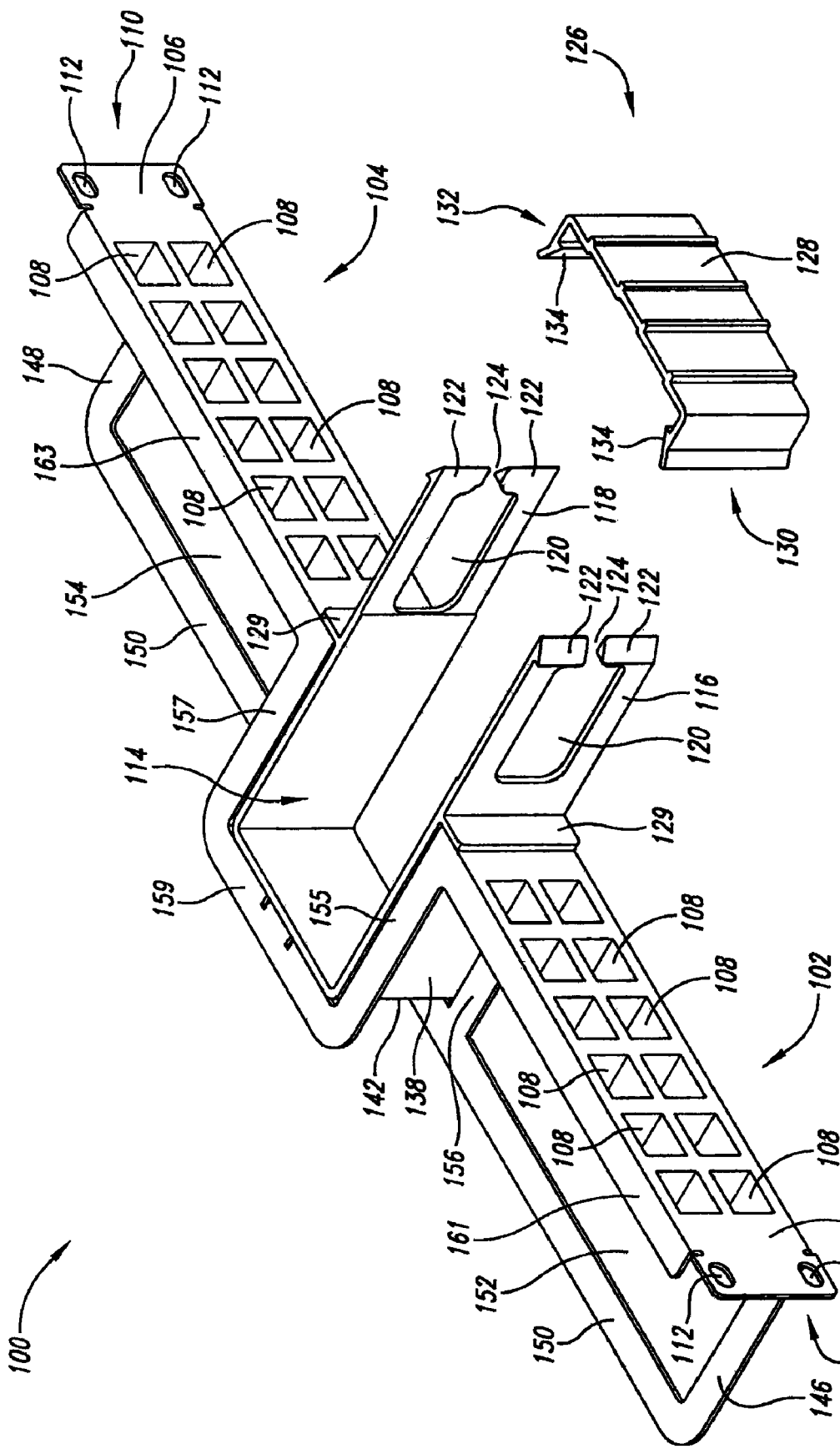
FIG. 4 is an exploded front perspective view of a two row cable management patch panel system with vertical ducting.

Other implementations of the patch panel system 100 can have other numbers of rows of the connectors 108. For instance, a two row patch panel system is shown in FIG. 4.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

What is claimed is:

1. A patch panel for use with cables and an equipment rack having spaced apart first and second side members that are separated to receive equipment therebetween, the first side member being positioned along a first side of the equipment rack, and the second side member being positioned along a second side of the equipment rack, the patch panel comprising:

a first portion couplable to the first side member of the equipment rack and having a plurality of connectors couplable to the cables, the first portion extending away from the first side of the equipment rack and toward the second side of the same equipment rack;

a second portion couplable to the second side member of the same equipment rack, the second portion extending away from the second side of the equipment rack and toward the first side of the same equipment rack, the first portion and the second portion being separated by a distance along a first direction extending between the first and second sides of the same equipment rack; and a connectorless portion positioned between and coupled to the first portion and the second portion, the connectorless portion including an enclosure extending in a second direction that is other than parallel to the first direction and sized to receive and route the cables in the second direction when the cables are coupled to the plurality of connectors of the first portion.

2. The patch panel of claim 1, further including a plurality of connectors mounted to the second portion.

3. The patch panel of claim 1, wherein the connectorless portion has spaced apart first and second wall portions extending away from the first and second portions, respectively, each in a direction other than parallel to the first direction, and wherein the connectorless portion has a third wall portion extending between the first and second wall portions, the first, second and third wall portions defining at least a portion of the enclosure.

4. The patch panel of claim 3, wherein the connectorless portion further includes spaced apart fourth and fifth wall portions extending away from the first and second portions, respectively, each in a direction other than parallel to the first direction, and the first, second, third, fourth and fifth wall portions defining at least a portion of the enclosure.

5. The patch panel of claim 4, wherein the fourth and fifth wall portions are spaced apart and define an opening of the enclosure facing in a direction other than parallel to the first direction.

6. The patch panel of claim 5, further including a cap sized to extend between and removably attach to the fourth and fifth wall portions to selectively close the opening of the enclosure.

7. The patch panel of claim 3, wherein the first and second wall portions are in substantially parallel arrangement and extend transverse to the first direction, and the third wall portion extends substantially parallel to the first direction.

8. The patch panel of claim 7, wherein the connectorless portion further includes spaced apart fourth and fifth wall portions, the fourth wall portion extending away from the first portion in a direction opposite the first wall portion and the fifth wall portion extending from the second portion in a direction opposite the second wall portion, and wherein the first, second, third, fourth and fifth wall portions defining at least a portion of the enclosure.

9. The patch panel of claim 8, wherein the fourth and fifth wall portions are in substantially parallel arrangement and extend transverse to the first direction.

10. A patch panel for use with cables and mountable to an equipment rack with spaced apart first and second side members separated to receive equipment therebetween, the patch panel comprising:
a first panel portion having an attachment portion couplable to the first side member of the equipment rack and an inward portion spaced apart therefrom with a connector mounting portion therebetween;
a second panel portion having an attachment portion couplable to the second side member of the same equipment rack and an inward portion spaced apart therefrom with a connector mounting portion therebetween;
a first plurality of connectors supported by the connector mounting portion of the first panel portion, the first plurality of connectors being couplable to at least a portion of the cables;
a second plurality of connectors supported by the connector mounting portion of the second panel portion, the second plurality of connectors being couplable to at least a portion of the cables;
an upright first wall portion positioned adjacent to the inward portion of the first panel portion; and
an upright second wall portion positioned adjacent to the inward portion of the second panel portion, the first and second wall portions defining an enclosure therebetween with an upper open end and a lower open end sized to receive the cables therein for routing through the upward and lower open ends when the cables are coupled to at least one of the first plurality of connectors and the second plurality of connectors.

11. The patch panel of claim 10, wherein the first and second walls are without connectors mounted thereto.

12. The patch panel of claim 10, wherein each of the first and second wall portions have an opening, an edge, and a slot extending fully between the opening and the edge sized for passage of one of the cables therethough.

13. The patch panel of claim 10, further including a cover removably coupled to the first wall portion and the second wall portion, and extending therebetween.

14. A patch panel for use with a plurality of cables and mountable to an equipment rack with spaced apart first and second side members separated to receive equipment therebetween, the first side member being positioned along a first side of the equipment rack, and the second side member being positioned along a second side of the equipment rack, the patch panel comprising:
a first portion couplable to the first side member of the equipment rack and adapted to receive a plurality of connectors, the first portion extending away from the first side of the equipment rack and toward the second side of the same equipment rack;
a second portion couplable to the second side member of the same equipment rack and adapted to receive a plurality of connectors, the second portion extending away from the second side of the equipment rack and toward the first side of the same equipment rack, the first portion and the second portion being separated by a distance along a first direction between the first and second sides of the equipment rack; and
a connectorless portion positioned between and coupled to the first portion and the second portion, the connectorless portion including an enclosure extending in a second direction that is other than parallel to the first direction and sized to receive and route the plurality of the cables in the second direction.

15. The patch panel of claim 14, wherein the connectorless portion has spaced apart first and second wall portions extending away from the first and second portions, respectively, each in a direction other than parallel to the first direction, and wherein the connectorless portion has a third wall portion extending between the first and second wall portions, the first, second and third wall portions defining at least a portion of the enclosure.

16. The patch panel of claim 15, wherein the connectorless portion further includes spaced apart fourth and fifth wall portions extending away from the first and second portions, respectively, each in a direction other than parallel to the first direction, the first, second, third, fourth and fifth wall portions defining at least a portion of the enclosure.

17. The patch panel of claim 16, wherein the fourth and fifth wall portions are spaced apart and define an opening of the enclosure facing in a direction other than parallel to the first direction.

18. The patch panel of claim 17, further including a cap sized to extend between and removably attach to the fourth and fifth wall portions to selectively close the opening of the enclosure.

19. A patch panel for use with cables and mountable to an equipment rack with spaced apart first and second side members separated by a space configured to receive equipment, the patch panel comprising:
a first panel portion having an attachment portion couplable to the first side member of the equipment rack and an inward portion spaced apart therefrom with a connector mounting portion therebetween configured to receive a plurality of connectors;
a second panel portion having an attachment portion couplable to the second side member of the same equipment rack and an inward portion spaced apart therefrom with a connector mounting portion therebetween configured to receive a plurality of connectors;
an upright first wall portion positioned adjacent to the inward portion of the first panel portion; and
an upright second wall portion positioned adjacent to the inward portion of the second panel portion, the first and second wall portions defining an enclosure therebetween with an upper open end and a lower open end sized to receive the cables therein for routing through the upward and lower open ends, at least a portion of the enclosure being positioned inside the space separating the first and second side members of the same equipment rack when the first and second panel portions are coupled to the first and second side members, respectively, of the same equipment rack.

20. The patch panel of claim 19, wherein the first and second walls are without connectors mounted thereto.

21. The patch panel of claim 19, wherein each of the first and second wall portions have an opening positioned outward of the first and second panel portions, respectively, an edge, and a passageway extending fully between the opening and the edge sized for passage of one of the cables therethough.

22. The patch panel of claim 19, further including a third wall portion extending between the first and second wall portion with the first, second and third wall portions defining an enclosure therebetween, and wherein the first and second wall portions are spaced apart and define an opening of the enclosure facing in a direction away from the third wall portion.

23. The patch panel of claim 22, further including a cap sized to extend between the first and second wall portions and operable to selectively open and close the opening of the enclosure.

* * * * *